3,290,128
STEEL WELDMENTS

Samuel J. Manganello, Penn Hills Township, Allegheny County, and Allan M. Rathbone, Franklin Township, Westmoreland County, Pa., assignors to United States Steel Corporation, a corporation of Delaware
No Drawing. Filed Feb. 21, 1966, Ser. No. 528,821
3 Claims. (Cl. 29—196.1)

This invention relates to a metal article having a weld therein. More particularly, the invention relates to steel weldments wherein the filler metal is designed to be compatible with low carbon base metals. The term "low carbon base metal" as herein refers to steels containing from about 0.05 to about 0.20% carbon.

There is a continuing need for high performance filler metals for welding constructional alloy steels with yield strengths in the range of 80 to 140K s.i. In both the as-deposited and stress-relieved conditions, such filler metals must be capable of depositing weld metals having yield and tensile strengths approximately equal to those of the base metal. In addition, the filler metals must have good toughness and high resistance to weld cracking. The present invention involves a weldment comprising base metal sections having a weld therein in which the base metal sections of the weldment consist essentially of steel which contains 0.05 to about 0.2% carbon, 0.1 to 1% manganese, 3 to 6% nickel, 0.3 to 1.0% chromium and 0.3 to 0.7% molybdenum.

For many applications, it is desired that the weld metal have a yield strength on the order of 120K s.i. or greater. Since high yield strength steels are frequently used in pressure vessel construction, it is desirable that they also have good toughness. For many purposes, the weld metal ought to have a toughness of at least about 30 ft.-lb. energy absorption at 0° F., and a toughness of 50 ft.-lb. at 0° F. is generally preferred. We have found that weldments according to the invention may exhibit yield strength as high as 145K s.i. Moreover, this high yield strength is accompanied by good hardenability, a low transition temperature, high resistance to shear tearing, and a low susceptibility to weld cracking. We have accomplished this by providing a weld metal with relatively low manganese and high nickel. This combination results in a weld with less susceptibility to weld cracking, less susceptibility to stress relief or temper embrittlement and better low temperature toughness. Filler metal for the weldments in accordance with the invention consists essentially of (in percent by weight) 0.05 to 0.12% carbon, 0.4 to 1.0% manganese, 4 to 6% nickel, 0.4 to 0.9% chromium, 0.4 to 0.7% molybdenum, 0.01 to 0.04% aluminum, 0.16 to 0.4% silicon, up to 0.03% titanium, up to .08% vanadium, up to 5% cobalt, up to 0.015% nitrogen, up to 0.010% each of phosphorus and sulfur, and the balance substantially iron (i.e. iron with other usual steelmaking impurities).

Although silicon, titanium and aluminum can be absent individually, it is necessary that one or more be present to achieve proper deoxidation to minimize porosity. Thus, the filler metal composition also must contain the following minimum combinations of alloying elements (min. = minimum net percent):

| | Min. |
|---|---|
| Si+Al | 0.2 |
| Si+Ti | 0.2 |
| Ti+Al | About 0.04 |
| Si+Ti+Al | 0.23 |

Cobalt additions up to about 5%, preferably 2 to 5%, are beneficial for increasing the amount of self tempering that occurs during welding; however, cobalt is undesirable in applications involving nuclear irradiation. Because radioactive cobalt is produced upon irradiation, it is best to use as little cobalt as possible for nuclear applications.

The need for vanadium is related to the combined amounts of chromium and molybdenum. Both chromium and molybdenum strongly increase both hardenability and resistance to softening, whereas vanadium only mildly increases hardenability but strongly increases resistance to softening. Thus, for applications that do not require very high hardenability, the combined chromium and molybdenum content should be kept low. The loss in resistance to softening which accompanies the lowering of chromium and molybdenum can be compensated for by maintaining the vanadium content in the range of 0.04 to 0.08%. If no vanadium additions are made and no steps taken to remove it, the steel will still usually contain up to about 0.02% vanadium.

As an illustration of weldments in accordance with the invention, a number of solid bare wires of the compositions described in Table I were prepared for use as inert-gas-shielded filler metals. These materials were evaluated as welds, and their mechanical properties were determined; the mechanical properties are described in Table II. As can be seen, the yield strengths of the welds were quite acceptable and all were above 120K s.i. with mast above 130K s.i.

TABLE I.—COMPOSITIONS OF HIGH-YIELD-STRENGTH ALLOY STEEL FILLER METALS

| Item | C | Mn | P | S | Si | Ni | Co | Cr | Mo | V | Ti | Al | N |
|---|---|---|---|---|---|---|---|---|---|---|---|---|---|
| A | 0.078 | 0.75 | 0.004 | 0.006 | 0.24 | 5.22 | (¹) | 0.55 | 0.58 | (¹) | (¹) | 0.029 | 0.005 |
| B | 0.082 | 0.76 | 0.003 | 0.006 | 0.26 | 5.18 | 4.12 | 0.47 | 0.56 | (¹) | (¹) | 0.028 | 0.004 |
| C | 0.084 | 0.74 | 0.002 | 0.007 | 0.39 | 5.18 | 4.24 | 0.54 | 0.55 | (¹) | 0.013 | (¹) | 0.005 |
| D | 0.048 | 0.72 | 0.001 | 0.004 | 0.24 | 5.14 | 4.20 | 0.54 | 0.56 | 0.065 | 0.006 | 0.005 | 0.005 |
| E | 0.077 | 1.04 | 0.003 | 0.003 | 0.35 | 5.02 | 4.07 | 0.85 | 0.54 | 0.048 | 0.011 | (¹) | 0.001 |
| F | 0.080 | 1.06 | 0.005 | 0.008 | 0.38 | 4.02 | (¹) | 0.54 | 0.56 | 0.045 | 0.016 | (¹) | 0.001 |
| G | 0.091 | 1.04 | 0.004 | 0.008 | 0.38 | 4.00 | (¹) | 0.81 | 0.55 | 0.044 | 0.013 | (¹) | 0.002 |
| H | 0.084 | 1.46 | 0.003 | 0.002 | 0.35 | 4.89 | (¹) | 0.55 | 0.53 | 0.050 | 0.011 | (¹) | 0.001 |

¹ No deliberate addition.

TABLE II.—MECHANICAL PROPERTIES OF HIGH-YIELD STRENGTH ALLOY STEEL FILLER METALS

| Item | All-Weld-Metal Tensile Properties ||||  All-Weld-Metal, Charpy V-Notch Energy Absorption, ft.-lb. ||| Transverse Tensile Properties |||
|---|---|---|---|---|---|---|---|---|---|---|
| | Yield Strength (0.2% Offset), K s.i. | Tensile Strength, K s.i. | Elongation in 1 Inch, Percent | Reduction of Area, Percent | +80° F. | 0° F. | −60° F. | Yield Strength (0.2% Offset), K s.i. | Tensile Strength, K s.i. | Fracture Location |
| A | 132 | 143 | 18.0 | 58 | 48 | 43 | 42 | 145 | 153 | Base metal. |
| B | 124 | 136 | 20.0 | 63 | 55 | 38 | 34 | 143 | 148 | Weld metal. |
| C | 132 | 145 | 20.3 | 66 | 82 | 75 | 61 | 141 | 152 | Base metal. |
| D | 123 | 132 | 18.5 | 61 | 51 | 46 | 34 | 130 | 146 | Weld metal. |
| E | 135 | 154 | 18.1 | 63 | 71 | 61 | 56 | | | |
| F | 135 | 146 | 18.0 | 60 | 76 | 76 | 67 | | | |
| G | 137 | 157 | 18.0 | 60 | 54 | 47 | 42 | | | |
| H | 133 | 155 | 18.0 | 62 | 54 | 49 | 38 | | | |

The low temperature toughness of high yield strength steels increases with increased nickel content and by utilizing filler metal of high nickel content, weldments may be made which possess good low temperature toughness, a low transition temperature and high energy absorption. However, despite the beneficial effect of high nickel content, it is desirable to limit the amount of nickel to minimize hot shortness, and we have found a maximum of about 6% nickel should be used to avoid producing cored weld metal structures and to minimize hot shortness.

It is also noted that the filler metal according to the invention contains low amounts of carbide formers because large amounts of these elements promote embrittlement. Nevertheless, chromium, molybdenum and vanadium are desirable and necessary to increase hardenability and, in addition, increase resistance of the steel to softening upon multipass welding and/or stress relieving treatments.

To avoid porosity during welding, the filler metal is deoxidized with silicon, aluminum or titanium as discussed above. It has been found that a combination of silicon and titanium is particularly beneficial in producing an exceptionally good combination of strength and toughness.

It is apparent from the above that various changes and modifications may be made without departing from the invention. Thus, for example, the weldments according to the invention may be produced by a variety of welding procedures including inert-gas-shielding welding, submerged-arc welding, electroslag welding and welding by electron-beam melting. Any of these techniques should be quite suitable for depositing the filler metal if care is exercised to deposit a weld metal with the previously described composition.

We claim:
1. A weldment comprising a metal article having a steel weld therein, said metal consisting essentially of 0.05 to 0.2% carbon, 0.1 to 1% manganese, 3 to 6% nickel, 0.3 to 1% chromium, 0.3 to 0.7% molybdenum, and the balance substatnally iron, said steel weld consisting essentially of 0.05 to 0.12% carbon, 0.4 to 1.0% manganese, 4 to 6% nickel, 0.4 to 0.9% chromium, 0.4 to 0.7% molybdenum, up to 0.08% vanadium, 0.01 to 0.04% aluminum, 0.16 to 0.4% silicon, up to 0.30% titanium, up to 5% cobalt, up to 0.15% nitrogen and up to 0.010% each of sulfur and phosphorus, and the balance substantially iron, the silicon, aluminum and titanium being present in the following minimum amounts:

| | Percent |
|---|---|
| Si+Al | 0.2 |
| Si+Ti | 0.2 |
| Ti+Al | 0.04 |
| Si+Ti+Al | 0.23 | said weldment having a yield strength of at least 120K s.i. and a notch toughness of at least 30 ft.-lb. energy absorption at 0° F.

2. A weldment according to claim 1 wherein the weld contains 0.04 to 0.08% vanadium.

3. A weldment according to claim 1 wherein the weld contains 2 to 5% cobalt.

References Cited by the Examiner
UNITED STATES PATENTS

| 2,200,224 | 5/1940 | Strauss | 29—196.1 |
| 2,481,385 | 9/1949 | Bloom | 29—196.1 |
| 2,913,815 | 11/1959 | Muller. | |

HYLAND BIZOT, *Primary Examiner.*

UNITED STATES PATENT OFFICE
CERTIFICATE OF CORRECTION

Patent No. 3,290,128 December 6, 1966

Samuel J. Manganello et al.

It is hereby certified that error appears in the above numbered patent requiring correction and that the said Letters Patent should read as corrected below.

Column 2, line 50, for "mast" read -- most --; column 4, line 21, for "substatnally" read -- substantially --; line 25, for "0.30%" read -- 0.03% --; line 26, for "0.15%" read -- 0.015% --.

Signed and sealed this 26th day of September 1967.

(SEAL)

Attest:

ERNEST W. SWIDER
Attesting Officer

EDWARD J. BRENNER
Commissioner of Patents